(12) United States Patent
Knight et al.

(10) Patent No.: US 12,443,630 B1
(45) Date of Patent: Oct. 14, 2025

(54) DISPLAYING AN INTERACTIVE GEOGRAPHICAL MAP OF SOURCES

(71) Applicant: Maplebear Inc., San Francisco, CA (US)

(72) Inventors: Benjamin Knight, Oakland, CA (US); Samuel K. Sherman, Seattle, WA (US); Daniely Zoller Cruz, Mt. Juliet, TN (US); Kenneth Jason Sanchez, Orange, CA (US); Christopher Billman, Chicago, IL (US); Rebecca Younis, Rochester, NY (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/678,819

(22) Filed: May 30, 2024

(51) Int. Cl.
*G06F 16/29* (2019.01)
*G06F 16/2457* (2019.01)
*G06Q 30/0601* (2023.01)

(52) U.S. Cl.
CPC ........ *G06F 16/29* (2019.01); *G06F 16/24578* (2019.01); *G06Q 30/0623* (2013.01); *G06Q 30/0641* (2013.01)

(58) Field of Classification Search
CPC .............. G06F 16/29; G06F 16/24578; G06Q 30/0623; G06Q 30/0641
See application file for complete search history.

(56) References Cited

U.S. PATENT DOCUMENTS

2019/0303451 A1 * 10/2019 Takahashi ........... G06F 16/5866

* cited by examiner

*Primary Examiner* — Truong V Vo
(74) *Attorney, Agent, or Firm* — Fenwick & West LLP

(57) ABSTRACT

An online system receives a request to access an interactive geographical map of sources from a client device associated with a user. The system retrieves data describing a geographical location associated with the user. The system identifies one or more sources within a threshold distance of the location and retrieves data including information describing items available at each source. For each source, the system accesses and applies a machine-learning model to predict a user engagement score indicating a likelihood of one or more interactions by the user with a set of items available at the source if the source is included in the map. Based on the score for each source, the system selects a set of sources and generates the map, in which the map indicates the geographical location of each selected source. The map is then sent to the client device, causing the device to display the map.

20 Claims, 7 Drawing Sheets

DISPLAYING AN INTERACTIVE GEOGRAPHICAL MAP OF SOURCES

BACKGROUND

Online systems provide their users with the convenience of placing orders that are delivered to the users. When placing an order, a user may be presented with information describing several sources (e.g., retailer locations, warehouses, etc.) from which they may order items. For example, a user may be presented with names and hours of operation for various sources, as well as the types of the sources (e.g., grocery retailer, department store, supermarket, etc.). Users may prefer to order items from particular sources for various reasons that are specific to each user. For example, users who are interested in supporting local small businesses and reducing their carbon footprint may prefer to order items from sources such as local farmers' markets and local family-owned shops. As an additional example, users who are interested in specialty items may prefer to order these items from particular sources with boutiques that specialize in the items and carry specific brands or varieties of the items.

However, due to the variability in the preferences of users of online systems for different sources and items, the descriptions of the sources may not be relevant to the users to whom they are presented. For example, suppose that a user prefers to order locally grown organic produce and is presented with general information describing several sources corresponding to grocery retailers. In the above example, suppose also that the majority of the sources either do not carry organic produce that is locally grown or only carry a small selection of locally grown organic produce. In this example, if the user selects one of these sources, they may not become aware that the source does not carry an item that they would like to order until they search for the item and are unable to find it. Continuing with this example, the user may have to then select a different source and then repeat this process for each item they would like to order until they find a source that carries all of the items, which the user may find time consuming and frustrating. Therefore, the inability of online systems to provide information about sources that is relevant to their users may negatively affect the users' ordering experiences.

SUMMARY

In accordance with one or more aspects of the disclosure, an online system displays an interactive geographical map of sources. More specifically, an online system receives, from a client device associated with a user of the online system, a request to access an interactive geographical map of sources. The online system then retrieves a set of user data for the user, in which the set of user data includes information describing a geographical location associated with the user. The online system identifies one or more sources within a threshold distance of the geographical location associated with the user and retrieves a set of source data for each source, in which the set of source data includes information describing a set of items available at each source. The online system accesses and applies a machine-learning model to predict a user engagement score for each source, in which the score indicates a likelihood of one or more interactions by the user with the set of items available at the source if the source is included in the interactive geographical map of sources. Based on the user engagement score for each source, the online system selects a set of sources and generates the interactive geographical map of sources based on the set of sources, in which the map indicates the geographical location of each selected source. The interactive geographical map of sources is then sent to the client device, causing the client device to display the map.

DETAILED DESCRIPTION

Figure 1:
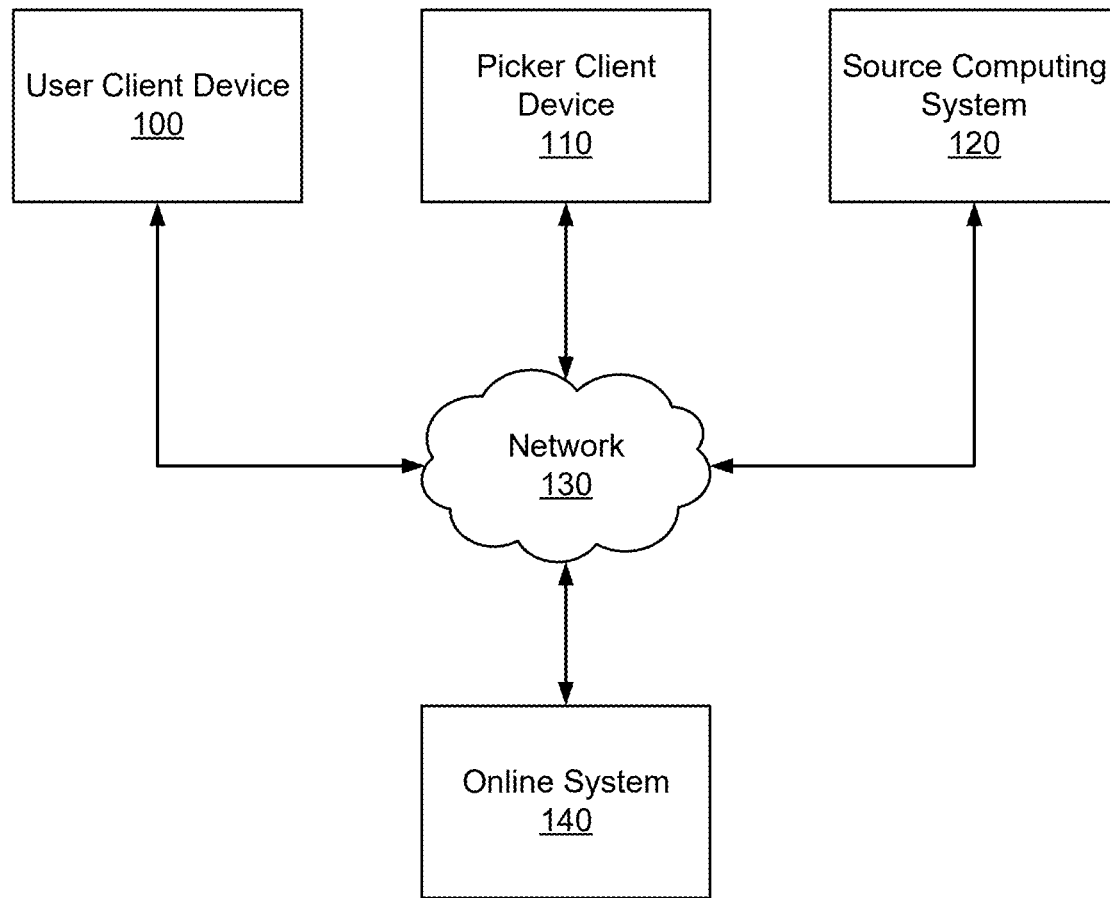
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and source operators may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 may be a personal or mobile computing device, such as a smartphone, a tablet, a laptop computer, or a desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, refers to a good or product that may be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user may use to place an order with the online system 140. The ordering interface may be part of a client application operating on the user client device 100. The ordering interface allows the user to search for items that are available through the online system 140 and the user may select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the items should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 may be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker identifying items to collect for a user's order and the quantities of the items. In some embodiments, the collection interface provides multiple orders from multiple users for the picker to service at the same time from the same source. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker may use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the source to receive the weight of an item.

When the picker has collected all of the items for an order, the picker client device 110 provides instructions to a picker for delivering the items for a user's order. For example, the picker client device 110 displays a delivery location from the order to the picker. The picker client device 110 also provides navigation instructions for the picker to travel from the source to the delivery location. When a picker is servicing more than one order, the picker client device 110 identifies which items should be delivered to which delivery location. The picker client device 110 may provide navigation instructions from the source to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a source and delivers the order to the delivery location for the order. Alternatively, more than one person may serve the role as a picker for an order. For example, multiple people may collect the items at the source for a single order. Similarly, the person who delivers an order to its delivery location may be different from the person or people who collected the items from the source. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully-autonomous robot may collect items in a source for an order and an autonomous vehicle may deliver an order to a user from a source.

The source computing system 120 is a computing system operated by a source operator that interacts with the online system 140. As used herein, a "source operator" is an entity, such as a retailer, that operates a "source," which is a retailer location, a store, a warehouse, a farm, a stand, a truck, or other location or building from which a picker can collect items or from which a user may order or purchase items. For example, a source may be a stand at a farmers' market operated by a source operator, such as a farmer or a farm employee. As an additional example, a source operator may be an individual that operates a food stand or a food truck. The source computing system 120 stores and provides item data to the online system 140 and may regularly update the online system 140 with updated item data. For example, the source computing system 120 provides item data indicating which items are available at a particular source and the quantities of those items. Additionally, the source computing system 120 may transmit updated item data to the online system 140 when an item is no longer available at the source. Furthermore, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which users can order items to be provided to them by a picker from a source. The online system 140 receives orders from a user client device 100 through the network 130. The online system 140 selects a picker to service the user's order and transmits the order to a picker client device 110 associated with the picker. The picker collects the ordered items from a source and delivers the ordered items to the user. The online system 140 may charge a user for the order and provide portions of the payment from the user to the picker and the source operator. As an example, the online system 140 may allow a user to order groceries from a grocery store retailer. The user's order may specify which groceries they want delivered from the grocery store and the quantities of each of the groceries. The user's client device 100 transmits the user's order to the online system 140 and the online system 140 selects a picker to travel to the grocery store retailer location to collect the groceries ordered by the user. Once the picker has collected the groceries ordered by the user, the picker delivers the groceries to a location transmitted to the picker client device 110 by the online system 140. The online system 140 is described in further detail below with regards to FIG. 2.

Figure 2:
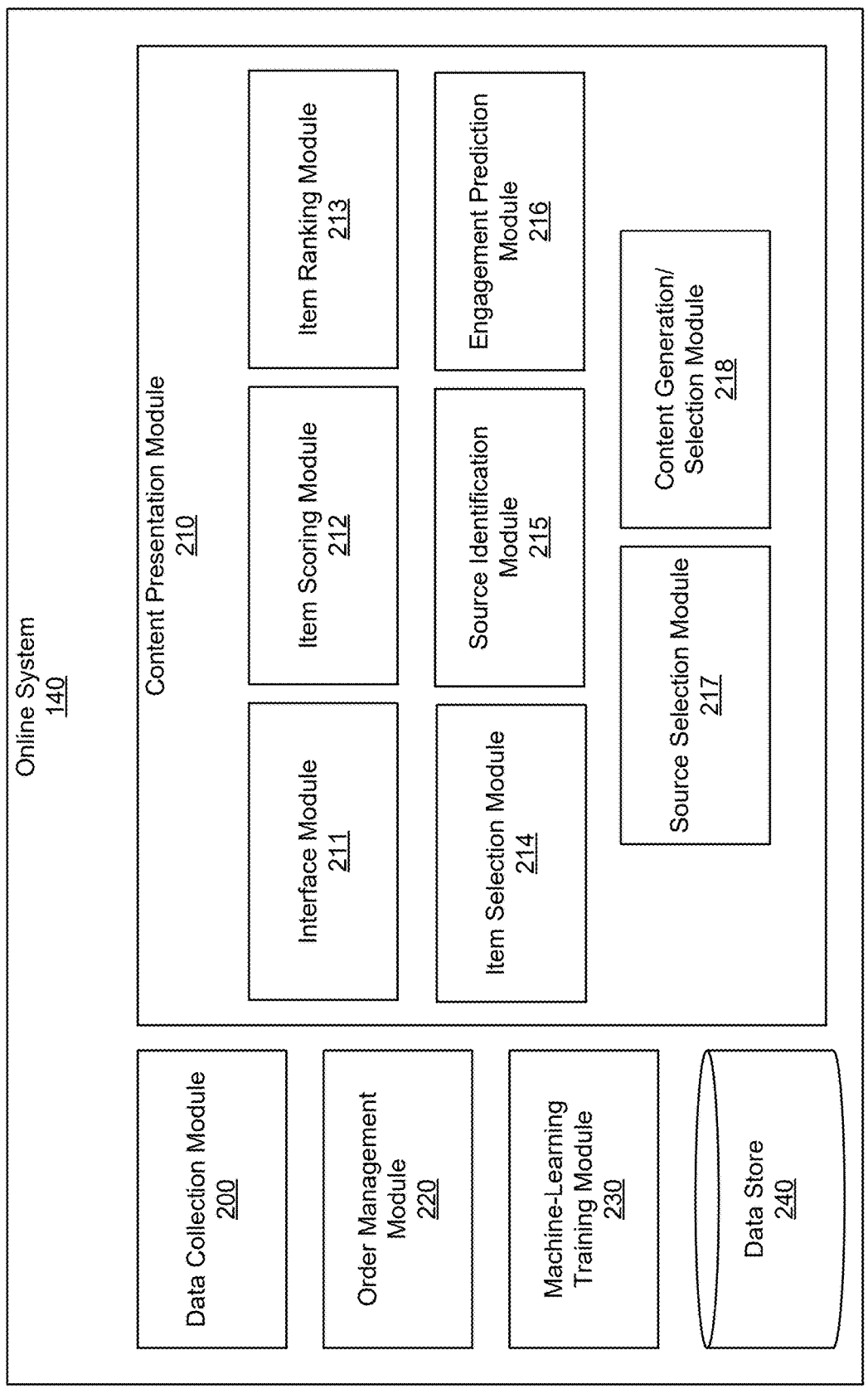
FIG. 2 illustrates an example system architecture for an online system, in accordance with one or more embodiments.

FIG. 2 illustrates an example system architecture for an online system 140, such as an online concierge system, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects user data, which is information or data describing characteristics of a user. User data may include a user's name, address, shopping preferences (e.g., preferred or favorite sources/items), dietary restrictions/preferences, or stored payment instruments. User data also may include one or more geographical locations associated with a user, such as a delivery address associated with the user, a geographical location of a user client device 100 associated with the user, a hometown of the user, a geographical location specified by the user (e.g., as an area of interest, a saved location, etc.), or any other suitable geographical location associated with the user. Additionally, user data may include a user's interests or hobbies, as well as demographic information associated with the user (e.g., age, gender, geographical region, educational background, occupation, etc.) or household information associated with the user (e.g., a number of people in the user's household, whether the user's household includes children or pets, etc.). The user data also may include default settings established by a user, such as a default source operator/source, payment instrument, delivery location, or delivery timeframe. In some embodiments, user data for a user also includes one or more user engagement scores for one or more sources. A user engagement score for a source indicates a likelihood of one or more interactions by a user with a set of items available at the source if the source is included in an interactive geographical map of sources that is presented to the user, as further described below. The user engagement score(s) may be used to retrain the engagement prediction model, as also further described below.

User data further may include historical information associated with a user. For example, user data may include historical conversion information associated with a user, such as historical order or purchase information associated with the user. In this example, the historical order information may describe previous orders placed by the user with the online system 140, such as one or more items included in each order (e.g., an item category, a size, a brand, a quantity, a price, etc. associated with each item), a time each order was placed, a source from which the item(s) included in each order was/were collected, etc. Continuing with this example, the historical order information also may include a review, a rating, or instructions associated with each order provided by the user, as well as information indicating whether one or more items were removed from or replaced in each order, whether each order was associated with an issue, a complaint, a refund, a cancellation, etc. In the above example, the historical purchase information similarly may describe previous purchases made by the user and may include information describing one or more items included in each purchase, a time each purchase was made, information describing a source from which each purchase was made, etc. As yet another example, user data may include historical interaction information describing previous interactions by a user with items or other types of content (e.g., coupons, advertisements, recipes, interactive elements within an ordering interface or an interactive geographical map of sources, etc.) presented by the online system 140. In this example, the historical interaction information may describe the items or other types of content, a time or a duration of each interaction, a type of each interaction, etc.

User data also may include information describing a measure of satisfaction of a user with the freshness of an item available at a source. A measure of satisfaction of a user with the freshness of an item may be described by a freshness satisfaction score that indicates the measure of satisfaction. For example, a freshness satisfaction score for an item may correspond to a value that is proportional to a measure of satisfaction of a user with the freshness of the item, in which a high score indicates the user is highly satisfied with the freshness of the item and a low score indicates the user is highly dissatisfied with the freshness of the item. A measure of satisfaction of a user with the freshness of an item may be received from the user (e.g., via a survey, a questionnaire, etc. sent to a user client device 100 associated with the user), derived (e.g., from a review for an order that includes the item, as described below), or predicted (e.g., using the item scoring module 212 of the content presentation module 210, as also described below). Furthermore, information describing a measure of satisfaction of a user with the freshness of an item may be stored in the data store 240 in association with various types of information. For example, a freshness satisfaction score for an item available at a source may be stored in association with information describing the item and the source, a time at which it was predicted, a user associated with the score, etc. The data collection module 200 may collect the user data from sensors on the user client device 100 or based on the user's interactions with the online system 140. The data collection module 200 also may collect the user data from the item scoring module 212 or the engagement prediction module 216 of the content presentation module 210, as further described below.

The data collection module 200 also collects item data, which is information or data identifying and describing items that are available at a source. The item data may include item identifiers for items that are available and may include quantities of items associated with each item identifier. Additionally, item data may also include attributes of items such as the sizes, colors, weights, stock keeping units (SKUs), serial numbers, prices, item categories, brands, qualities (e.g., freshness, ripeness, etc.), ingredients, materials, manufacturing locations, versions/varieties (e.g., flavors, low fat, gluten-free, organic, etc.), availabilities/seasonalities, or any other suitable attributes of the items. The item data may further include purchasing rules associated with each item, if they exist. For example, age-restricted items such as alcohol and tobacco are flagged accordingly in the item data. Item data may also include information that is useful for predicting the availability of items at sources. For example, for each item-source combination (a particular item at a particular source), the item data may include a time that the item was last found, a time that the item was last not found (a picker looked for the item but could not find it), the rate at which the item is found, or the popularity of the item.

An item category is a set of items that are a similar type of item. Items in an item category may be considered to be equivalent to each other or may be replacements for each other in an order. For example, different brands of sourdough bread may be different items, but these items may be in a "sourdough bread" item category. In some embodiments, item categories may be broader in that the same item category may include item types that are related to a common theme, found in the same department, etc. For example, items such as apples, oranges, lettuce, and cucumbers may be included in a "produce" item category. As an additional example, items such as bread, pasta, and cookies that are gluten-free may be included in a "gluten-free" item category, while items such as tortilla chips and tofu that are non-GMO may be included in a "non-GMO" item category. Furthermore, in various embodiments, an item may be included in multiple categories. For example, croissants may be included in a "croissant" item category, a "pastry" item category, and a "bakery" item category. The item categories may be human-generated and human-populated with items. The item categories also may be generated automatically by the online system 140 (e.g., using a clustering algorithm).

Item data may include additional types of information or data identifying and describing items that are available at a source, as well as information describing the source. For example, the item data for an item available at a source may describe a geographical location of the source (e.g., an address and a time zone associated with the source), operating hours for the source, etc., as well as a source operator that operates the source, such as a name of the source operator, a type of the source operator (e.g., a grocery retailer or a retailer of prepared foods), etc. The item data also may include a freshness satisfaction score for an item available at a source. As described above, a freshness satisfaction score for an item indicates a measure of satisfaction of a user with the freshness of the item. The item data also may include information describing a life cycle of an item. For example, the item data for an item corresponding to a fruit or a vegetable may include a harvest date associated with the item, a shipping and handling time associated with the item, an amount of time elapsed since the item became available for order or purchase from a source, or a shelf life associated with the item (e.g., as a best by or a use by date, a number of days after the harvest date, etc.). In the above example, if the item is a different type of item, the item data also may include other types of information that may describe its life cycle (e.g., a date or a time it was made, packaged, etc.). Additionally, the item data may include information describing an environment in which an item should be stored (e.g., to prolong its shelf life). For example, the item data for an item may describe a temperature range of a location in which the item should be stored, an optimal humidity or light exposure associated with the location, etc.

Item data also may include information describing an availability of an item at a source. Information describing an availability of an item at a source may describe an amount or a quantity of the item that is available or expected to be available at the source. For example, information describing an availability of white peaches at a source may describe a quantity of white peaches currently available at the source, as well as information describing future shipments of white peaches to the source (e.g., quantities of the white peaches included in each shipment, a shipment schedule for the white peaches, etc.). Information describing an availability of an item at a source also may describe a quality, a freshness, or other characteristics of the item that is available or expected to be available at the source, which may be indicated by a set of images of the item captured at the source, environmental information associated with the item at the source, or any other suitable types of information. For example, information describing an availability of strawberries at a farmers' market stand may include a set of images depicting the strawberries captured by a farmer or a farm employee that operates a farm stand (e.g., using a source computing system 120) or by one or more picker client devices 110 associated with one or more pickers while each picker was servicing an order at the farmers' market. As an additional example, information describing an availability of bananas at a source may include environmental information describing a location within the source in which the bananas may be found, such as a temperature, a humidity, or a light exposure of the location or fluctuations in temperature, humidity, or light exposure of the location (if any). In this example, the environmental information associated with the bananas also may include a department associated with the location (e.g., a produce department), a visibility of the location (e.g., whether it is at the eye level of users), etc.

Item data also may include historical conversion information associated with an item available at a source. Historical conversion information associated with an item may include times, prices, user data, quantities of the item, etc. associated with previous conversions associated with the item, a frequency with which the item was previously acquired, etc. For example, historical conversion information associated with an item corresponding to watermelon may describe a time of the day or a day of the week when watermelon was ordered or purchased most frequently from a source. In this example, the historical conversion information also may describe attributes of users who ordered watermelon collected from the source most frequently, who purchased watermelon most frequently from the source, or who ordered/purchased the greatest quantities of watermelon from the source. In the above example, the historical conversion information also may include a price of the watermelon included in each order or purchase and a quantity of the watermelon ordered/purchased. The data collection module 200 may collect item data from a source computing system 120, a picker client device 110, or a user client device 100. The data collection module 200 also may collect the item data from the item scoring module 212 of the content presentation module 210, as further described below.

The data collection module 200 also may collect source data, which is information or data describing characteristics of sources. Source data for a source may include a description of the source, such as the source's name, a geographical location of the source, hours of operation for the source, etc., as well as information describing items available at the source, policies associated with the source (e.g., return/refund policies, warranties, etc.), or promotions available at the source. Source data for a source also may include information describing a source operator that operates the source (e.g., family owned/operated), a mission statement of the source, information describing any charities associated with the source, a date the source was founded/established, or information describing a history of the source or why the source was founded/established. Source data for a source also may include unique features of the source (e.g., specialties of the source, awards the source has won, farming practices used, sustainability initiatives implemented, etc.), a user rating for the source, reviews for the source, or any other suitable types of information associated with the source. In some embodiments, source data also includes one or more user engagement scores for one or more sources, which may be used to retrain the engagement prediction model, as further described below.

In some embodiments, the source data for a source includes a set of content items associated with the source. Content items associated with a source may be manually curated or they may be received from one or more user client devices 100. For example, a content item associated with a source may include a mission statement provided by a source operator that operates the source (e.g., "We strive to provide the freshest organic produce"). As an additional example, a content item associated with a source may include a review for the source received from a user client device 100 associated with a user who ordered items from the source (e.g., "Hands down, freshest organic produce in town!"). Content items associated with a source also may be generated (e.g., using a large language model), as further described below. The data collection module 200 may collect source data from a source computing system 120, a picker client device 110, or a user client device 100. The data collection module 200 also may collect source data from the engagement prediction module 216 or the content generation/selection module 218 of the content presentation module 210, as further described below.

The data collection module 200 also collects picker data, which is information or data describing characteristics of pickers. For example, the picker data for a picker may include the picker's name, the picker's location, how often the picker has serviced orders for the online system 140, a user rating for the picker, the sources from which the picker has collected items, or the picker's previous shopping history. Additionally, the picker data may include preferences expressed by the picker, such as their preferred sources for collecting items, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects conversion data, such as order data or purchase data. Order data is information or data describing characteristics of an order. For example, order data may include item data for items that are included in an order, a delivery location for the order, a user associated with the order, a source from which the user wants the ordered items collected, or a timeframe within which the user wants the order delivered. Order data may further include information describing how an order was serviced, such as which picker serviced the order, when the order was delivered, a rating that the user gave the order (e.g., for the collection of items included in the order or for the delivery of the order), or a review, a complaint, a refund, an issue, or a cancellation associated with the order. Order data also may include information describing a replacement or a removal of an item included in an order. In some embodiments, the order data includes user data for users associated with orders, such as user data for a user who placed an order or picker data for a picker who serviced the order. The order data also may include images or videos associated with an order (e.g., depicting one or more items included in the order), messages sent between a user client device 100 associated with a user who placed the order and a picker client device 110 associated with a picker who serviced the order, or any other suitable types of information. Purchase data is information or data describing characteristics of a purchase. Similar to the order data, the purchase data may include item data for items included in purchases or user data for users associated with purchases. For example, purchase data for a purchase may include item data for items that are included in the purchase, user data for a user who made the purchase, and information describing the purchase (e.g., a source from which the user purchased the items and a date and time of the purchase). In some embodiments, the conversion data includes information or data describing characteristics of one or more additional types of conversions (e.g., adding an item to a shopping list, clicking on an item, etc.).

In some embodiments, the data collection module 200 also derives information from other data stored in the data store 240 and stores this derived information in the data store 240 (e.g., in association with the data from which it was derived). For example, suppose that a set of user data for a user describes previous orders placed by the user with the online system 140 or previous purchases made by the user at sources. In the above example, based on the previous orders/purchases, the data collection module 200 may derive a frequency with which the user orders/purchases items associated with various attributes (e.g., an item category, a ripeness, a color, a brand, a weight, etc. associated with each item), a percentage of items the user orders/purchases that are on sale, and types of items that the user orders/purchases from a particular source. In the above example, the data collection module 200 also may derive a preference of the user for each item the user ordered/purchased, in which the preference of the user is proportional to a number of the item ordered/purchased or a frequency with which the user ordered/purchased the item. As an additional example, suppose that a set of user data for a user describes previous interactions by the user with various sources (e.g., markers on an interactive geographical map indicating the locations of the sources) or content items associated with the sources. In this example, based on the previous interactions, the data collection module 200 may derive preferences of the user for each source, such that the user's preference for a source may be proportional to a number of interactions with the source and a duration of each interaction. In the above example, if the sources with which the user interacts most frequently specialize in organic produce, the data collection module 200 may derive a preference of the user for sources that specialize in organic produce. As yet another example, the data collection module 200 may derive a preference of a user for items included in search queries received from a user client device 100 associated with the user.

Information derived by the data collection module 200 also may indicate whether a review for an order is positive or negative or whether it indicates a measure of satisfaction of a user with the freshness of an item. For example, the data collection module 200 may derive information indicating that a review is positive and indicates a measure of satisfaction of a user with the freshness of an item corresponding to fresh salmon if a review for an order including the salmon states: "Great job selecting the salmon!" In the above example, the data collection module 200 also may derive information indicating that the review is associated with a video depicting fresh salmon provided by the user in association with the review. Additionally, in the above example, suppose that an image depicting fresh salmon was communicated from a picker client device 110 associated with a picker servicing the order to a user client device 100 associated with the user. In this example, if a message subsequently communicated from the user client device 100 to the picker client device 110 indicated that the user was satisfied with the freshness of the salmon depicted in the image, the data collection module 200 also may derive information indicating that the review is associated with the image. The data collection module 200 may derive information using various techniques, such as natural language processing (NLP), computer-vision, speech recognition, or any other suitable technique or combination of techniques.

The content presentation module 210 selects content for presentation to a user. For example, the content presentation module 210 selects which items to present to a user while the user is placing an order. Components of the content presentation module 210 include: an interface module 211, an item scoring module 212, an item ranking module 213, an item selection module 214, a source identification module 215, an engagement prediction module 216, a source selection module 217, and a content generation/selection module 218, which are further described below.

The interface module 211 generates and transmits an ordering interface for the user to order items. The interface module 211 populates the ordering interface with items that the user may select for adding to their order. In some embodiments, the interface module 211 presents a catalog of all items that are available to the user, which the user can browse to select items to order. Other components of the content presentation module 210 may identify items that the user is most likely to order and the interface module 211 may then present those items to the user. For example, the item scoring module 212 may score items and the item ranking module 213 may rank the items based on their scores. In this example, the item selection module 214 may select items with scores that exceed some threshold (e.g., the top n items or the p percentile of items) and the interface module 211 then displays the selected items.

In response to receiving a request from a user client device 100 to access an interactive geographical map of sources, the interface module 211 also may generate the map and send it to the user client device 100, causing the user client device 100 to display the map. The interactive geographical map of sources is a geographical map that the interface module 211 may generate based on a set of sources selected by the source selection module 217, as described below. For example, the interactive geographical map of sources may indicate the geographical location of each selected source with a marker. As also described below, the set of sources selected by the source selection module 217 may be within a threshold distance of a geographical location associated with a user to whom the map is to be presented. For example, the interactive geographical map of sources may be a map of a geographical area within a 20-mile radius of a geographical location of a user client device 100 associated with a user to whom the map is to be presented. In various embodiments, the geographical locations of multiple sources may be indicated by a combined marker (e.g., a marker including a number indicating the number of sources represented by the marker). In some embodiments, the geographical map of sources is navigable, such that a user presented with the map may scroll to display additional geographical areas on the map.

The interactive geographical map of sources also may include additional content or components. In some embodiments, the interactive geographical map of sources indicates a geographical location associated with a user to whom the map is to be presented. In the above example, the map may include an additional marker indicating the geographical location of the user client device 100 associated with the user. The interactive geographical map of sources also may include a set of source data associated with each selected source. For example, for each source, the interactive geographical map of sources may include a window with a name, hours of operation, a user rating, a set of content items, etc. associated with the source. In embodiments in which the interactive geographical map of sources includes a set of content items associated with a source, the set of content items is generated or selected by the content generation/selection module 218, as described below. The interactive geographical map of sources also may include one or more interactive elements, such as buttons, scroll bars, etc. In the above example, the window also may include a scroll bar that allows a user to whom the map is presented to view the content items or a button that navigates the user to the ordering interface, allowing the user to add items associated with the source to a shopping list associated with the user.

The interface module 211 also may update the interactive geographical map of sources and send it to a user client device 100, causing the user client device 100 to display the updated map. In some embodiments, the interface module 211 updates the interactive geographical map of sources based on a zoom level associated with the map. For example, suppose that the interactive geographical map of sources indicates the geographical location of 10 sources within a 20-mile radius of a geographical location of a user client device 100, half of which are within a 10-mile radius of the geographical location of the user client device 100. In this example, the geographical location of each source may be indicated by a marker on the map. Furthermore, in this example, if some of the sources are within a threshold distance of each other in a display area of the user client device 100 (e.g., a threshold number of pixels), a geographical location of the sources may be indicated by a combined marker. Continuing with this example, if the interface module 211 receives a request from the user client device 100 to zoom in on the interactive geographical map of sources to display a geographical area within the 10-mile radius, the interface module 211 may update the map to include only this area and to indicate the location of the five sources within it. Furthermore, in this example, if the map originally included a combined marker indicating the geographical location of multiple sources, the geographical location of each source may be indicated by a separate marker if the geographical locations of the sources are no longer within the threshold distance of each other in the display area of the user client device 100. In the above example, suppose that the interface module 211 then receives a request from the user client device 100 to zoom out of the interactive geographical map of sources to display a geographical area within a 30-mile radius of the geographical location of the user client device 100. In this example, the interface module 211 may update the map to include this larger area and to indicate the location of the original 10 sources, as well as any additional sources within the 30-mile radius.

The interface module 211 also may update the interactive geographical map of sources based on additional types of information. In various embodiments, the interface module 211 updates the interactive geographical map of sources based on information describing a filter to be applied to the map. A filter may describe a set of source data associated with a source, such as an item category associated with a set of items available at the source, hours of operation for the source, a city in which the source is located, etc. In the above example, if the interface module 211 receives a request from the user client device 100 to apply a filter describing one or more item categories (e.g., meat, dairy, produce, etc.) to the interactive geographical map of sources, the interface module 211 may update the map by removing information indicating the location of sources at which items associated with the item categories are not available. The interface module 211 also may update the interactive geographical map of sources based on an interaction with an interactive element included in the map received from a user client device 100. For example, suppose that a marker indicating a geographical location of each source in the interactive geographical map of sources is an interactive element. In this example, the interface module 211 may update the interactive geographical map of sources to include a window with a name, hours of operation, a user rating, a set of content items, etc. associated with the source upon receiving an interaction with the marker (e.g., by hovering over or selecting the marker). As an additional example, suppose that the interactive geographical map of sources is navigable and that the interface module 211 receives an interaction with the map corresponding to a request to scroll beyond an edge of the map. In this example, based on the request, the interface module 211 may update the interactive geographical map of sources to include a geographical area beyond the edge of the geographical area originally displayed.

The item scoring module 212 may use an item selection model to score items for presentation to a user. An item selection model is a machine-learning model that is trained to score items for a user based on item data for the items and user data for the user. For example, the item selection model may be trained to determine a likelihood that the user will order an item. In some embodiments, the item selection model uses item embeddings describing items and user embeddings describing users to score items. These item embeddings and user embeddings may be generated by separate machine-learning models and may be stored in the data store 240.

In some embodiments, the item scoring module 212 scores items based on a search query received from the user client device 100. A search query is free text for a word or set of words that indicate items of interest to the user. The item scoring module 212 scores items based on a relatedness of the items to the search query. For example, the item scoring module 212 may apply natural language processing (NLP) techniques to the text in the search query to generate a search query representation (e.g., an embedding) that represents characteristics of the search query. The item scoring module 212 may use the search query representation to score candidate items for presentation to a user (e.g., by comparing a search query embedding to an item embedding).

In some embodiments, the item scoring module 212 scores items based on a predicted availability of an item. The item scoring module 212 may use an availability model to predict the availability of an item. An availability model is a machine-learning model that is trained to predict the availability of an item at a particular source. For example, the availability model may be trained to predict a likelihood that an item is available at a source or may predict an estimated number of items that are available at a source. The item scoring module 212 may apply a weight to the score for an item based on the predicted availability of the item. Alternatively, an item may be filtered out from presentation to a user by the item selection module 214 based on whether the predicted availability of the item exceeds a threshold.

The item scoring module 212 also may retrieve data from the data store 240. As described above, data stored in the data store 240 includes various types of data, such as item data, user data, conversion data, etc. For example, the item scoring module 212 may retrieve a set of item data for an item available at a source, such as information describing the availability of the item at the source (e.g., environmental information associated with the item at the source or a set of images of the item captured at the source), a life cycle of the item, or an environment in which the item should be stored. In this example, the set of item data also may include attributes (e.g., an availability/seasonality, one or more item categories, etc.) associated with the item, historical conversion information associated with the item, etc. In this example, the item scoring module 212 also may retrieve a set of user data for each of one or more users, such as information describing each user's favorite items or dietary restrictions/preferences. In the above example, the set of user data also may include demographic or household information associated with each user, historical information (e.g., historical conversion or interaction information) associated with each user, or information describing a measure of satisfaction of each user with the freshness of an item. In the above example, the item scoring module 212 also may retrieve a set of conversion data for each of one or more conversions (e.g., one or more orders or purchases), such as a time associated with each conversion, information describing a source operator or a source associated with each conversion, or a rating, review, complaint, refund, issue, cancellation, or replacement/removal (of an item) associated with each conversion (if any). In this example, the set of conversion data also may include item data for each item associated with each conversion, user data for a user associated with each conversion, etc.

The item scoring module 212 also may predict freshness satisfaction scores for items. As described above, a freshness satisfaction score for an item available at a source indicates a measure of satisfaction of a user with the freshness of the item. The item scoring module 212 may predict a freshness satisfaction score for an item based on data it retrieves from the data store 240 (e.g., item data or conversion data for one or more items, user data for one or more users, etc.). The item scoring module 212 may do so using various techniques applied to the retrieved data, such as natural language processing (NLP), computer-vision, speech recognition, or any other suitable technique or combination of techniques. The item scoring module 212 may associate different weights with different types of information used to make the prediction (e.g., by weighting newer data more heavily than older data). For example, when predicting a freshness satisfaction score for an item, the item scoring module 212 may weight images of the item captured at a source earlier in the day more heavily than images of the item captured at the source during the previous day. In some embodiments, a freshness satisfaction score is generalized for multiple users of the online system 140, such that it indicates a measure of satisfaction of the users with the freshness of an item. In other embodiments, a freshness satisfaction score is specific to a particular user of the online system 140, such that it indicates a measure of satisfaction of the user with the freshness of an item.

The following example illustrates how the item scoring module 212 may predict a freshness satisfaction score for an item corresponding to fresh tuna available at a source, in which the score is generalized for multiple users of the online system 140. Suppose that the item scoring module 212 retrieves a set of item data for the fresh tuna, in which the set of item data includes information describing the source or a life cycle of fresh tuna. In this example, the set of item data also may include one or more item categories associated with the fresh tuna, freshness satisfaction scores for the fresh tuna and other items associated with the item category/categories available at the source, and images depicting the fresh tuna captured at the source. In the above example, suppose that the item scoring module 212 also retrieves a set of conversion data associated with the fresh tuna including reviews indicating measures of satisfaction of users with the freshness of the fresh tuna.

Continuing with the above example, based on the retrieved information, the item scoring module 212 may predict a freshness satisfaction score for the fresh tuna that is generalized for multiple users of the online system 140. In this example, the freshness satisfaction score may be proportional to various retrieved values, such as an average freshness satisfaction score for the items associated with the item category/categories, the shelf life of fresh tuna, etc. In the above example, the freshness satisfaction score also may be inversely proportional to other retrieved values, such as an amount of time elapsed since the fresh tuna was caught, its shipping and handling time, the amount of time elapsed since it was delivered to the source, etc. Continuing with this example, the freshness satisfaction score also may be proportional to a number of characteristics of the fresh tuna depicted in the images indicating its freshness (e.g., shiny and tight scales, clear eyes, etc.) and inversely proportional to a number of characteristics of the fresh tuna depicted in the images indicating its lack of freshness (e.g., dull and loose scales, cloudy eyes, etc.). In this example, the freshness satisfaction score also may be proportional to a number of the reviews that are positive and inversely proportional to a number of the reviews that are negative, in which newer reviews are weighted more heavily than older reviews.

The following example illustrates how the item scoring module 212 may predict a freshness satisfaction score for an item corresponding to bananas available at a source, in which the score is specific to a particular user of the online system 140. Suppose that the item scoring module 212 retrieves a set of item data for the bananas, in which the set of item data includes information describing the source or a life cycle of bananas. In this example, the set of item data also may include one or more item categories associated with the bananas, freshness satisfaction scores specific to the user for items associated with the item category/categories available at the source, and images depicting the bananas captured at the source. Continuing with this example, the item scoring module 212 also may retrieve a set of user data for the user including information indicating that green bananas are one of the user's favorite items and historical order information describing previous orders placed by the user that were associated with positive reviews indicating a measure of satisfaction of the user with the freshness of bananas included in the orders and videos depicting the bananas.

In the above example, based on the retrieved information, the item scoring module 212 may predict a freshness satisfaction score for the bananas that is specific to the user. In this example, the freshness satisfaction score may be proportional to various retrieved values, such as an average freshness satisfaction score specific to the user for the items associated with the item category/categories, the shelf life of bananas, etc. In the above example, the freshness satisfaction score also may be inversely proportional to other retrieved values, such as an amount of time elapsed since the bananas were picked, their shipping and handling time, the amount of time elapsed since they were delivered to the source, etc. Continuing with this example, the freshness satisfaction score also may be proportional to a measure of similarity between the colors of the bananas depicted in the images captured at the source and the bananas depicted in the videos associated with the user's previous orders.

In some embodiments, the item scoring module 212 predicts a freshness satisfaction score for an item using a freshness satisfaction prediction model. A freshness satisfaction prediction model is a machine-learning model trained to predict a freshness satisfaction score for an item available at a source. To use the freshness satisfaction prediction model, the item scoring module 212 may access the model (e.g., from the data store 240) and apply the model to a set of inputs. The set of inputs may include various types of data retrieved by the item scoring module 212 described above. For example, the item scoring module 212 may access and apply the freshness satisfaction prediction model to a set of inputs including a set of item data for an item available at a source. In the above example, if the freshness satisfaction score being predicted is specific to a particular user of the online system 140, the set of inputs also may include a set of user data for the user.

Once the item scoring module 212 applies the freshness satisfaction prediction model to a set of inputs, the item scoring module 212 may then receive an output from the model. The output may include a value corresponding to the freshness satisfaction score for the item. The item scoring module 212 may then store the freshness satisfaction score in the data store 240 among a set of item data for the item or among a set of user data for a user associated with the score (if any). Additionally, the freshness satisfaction score may be stored in association with various types of information (e.g., information associated with the item, information associated with a user associated with the score, etc.). In the above example, the freshness satisfaction score may be stored among the set of item data for the item in association with information identifying the source, a time at which it was predicted, information describing the user, etc. In some embodiments, the freshness satisfaction prediction model may be trained by the machine-learning training module 230, as described below.

The source identification module 215 may retrieve a set of user data for a user from the data store 240. The set of user data may include information describing the geographical location associated with the user. As described above, a geographical location associated with a user may correspond to a delivery address associated with the user, a geographical location of a user client device 100 associated with the user, a hometown of the user, a geographical location specified by the user, or any other suitable geographical location associated with the user.

The source identification module 215 also may identify one or more sources within a threshold distance of a geographical location associated with a user. The source identification module 215 may do so by retrieving information describing a geographical location of each of various sources from the data store 240 and identifying the source(s) based on this information and a set of user data for the user retrieved from the data store 240. For example, suppose that the source identification module 215 has retrieved a set of user data for a user, in which the set of user data includes a geographical location of a user client device 100 associated with the user. In the above example, the source identification module 215 also may retrieve a set of source data for each of multiple sources, in which the set of source data for a source includes a geographical location of the source, such as an address of the source or GPS coordinates of the source. In this example, the source identification module 215 may identify one or more sources within a 15-mile radius of the geographical location of the user client device 100 based on the retrieved information. The threshold distance may be a default distance (e.g., a 10-mile radius) or it may be specified by the user. The source identification module 215 also may identify one or more sources based on a geographical location associated with a user and other types of criteria. For example, the source identification module 215 may identify one or more sources within the same city, the same zip code, etc. as that of a geographical location associated with a user.

The engagement prediction module 216 may retrieve various types of data from the data store 240. Examples of types of data the engagement prediction module 216 may retrieve include: source data for one or more sources identified by the source identification module 215, item data for one or more items available at the source(s) identified by the source identification module 215, user data for one or more users, or any other suitable types of data. For example, the engagement prediction module 216 may retrieve a set of source data for each source identified by the source identification module 215, such as a name of each source, hours of operation for each source, information describing items available at each source, a user rating for each source, a set of content items associated with each source, etc. In this example, the engagement prediction module 216 also may retrieve a set of item data for each item available at each source, such as a freshness satisfaction score for each item, an item category associated with each item, etc. In the above example, the engagement prediction module 216 also may retrieve a set of user data for each of one or more users, such as information describing each user's favorite items, dietary restrictions/preferences, hobbies, or interests. In this example, the set of user data also may describe previous interactions by each user with various sources, such as orders or purchases each user made from the sources, interactions by each user with markers on an interactive geographical map of sources (e.g., by hovering over or selecting the markers on the map indicating the locations of the sources) or with content items included in the map associated with the sources. In the above example, the set of user data also may include demographic or household information associated with each user, historical information (e.g., historical conversion or interaction information) associated with each user, etc.

The engagement prediction module 216 also predicts user engagement scores for sources. A user engagement score for a source indicates a likelihood of one or more interactions by a user with a set of items available at the source if the source is included in an interactive geographical map of sources that is presented to the user. In some embodiments, a user engagement score describes a predicted rate, a predicted value, or another predicted metric associated with a source. For example, a user engagement score for a source may describe a predicted conversion rate or a predicted long-term value for a user based on conversions by the user associated with items available at the source. The engagement prediction module 216 may predict a user engagement score for a source based on data it retrieves from the data store 240 (e.g., source data for the source, item data for one or more items available at the source, user data for a user, etc.). The user engagement score for a source may be proportional to a likelihood that a user will perform one or more interactions with a set of items available at the source. For example, suppose that historical conversion information for a user indicates that the user frequently ordered and purchased raw honey from a local farmers' market and has a preference for organic produce. In this example, based on the historical conversion information and user's preferences, the engagement prediction module 216 may predict a higher user engagement score for a local source at which raw honey and organic produce are available than for a non-local source at which raw honey and organic produce are not available. In the above example, the engagement prediction module 216 also may predict the user engagement scores for the sources based on user data for other users having at least a threshold measure of similarity to the user (e.g., users having similar preferences, interests, demographic information, etc.). In this example, the user engagement scores predicted for the sources may be proportional to a number or a frequency of previous interactions by the users with items available at the sources, ratings the users provided for the sources, etc.

In some embodiments, the engagement prediction module 216 predicts a user engagement score for a source using an engagement prediction model. An engagement prediction model is a machine-learning model trained to predict a user engagement score for a source. To use the engagement prediction model, the engagement prediction module 216 may access the model (e.g., from the data store 240) and apply the model to a set of inputs. The set of inputs may include various types of data retrieved by the engagement prediction module 216 described above. For example, the engagement prediction module 216 may access and apply the engagement prediction model to a set of inputs including a set of source data for a source (e.g., items available at the source, user reviews for the source, hours of operation for the source, etc.). In this example, the set of inputs also may include a set of user data for a user, such as the user's interests, preferences, hobbies, previous interactions by the user (e.g., with various items, sources, or an interactive geographical map of sources), etc. In the above example, the set of inputs also may include a set of item data for each item available at the source (e.g., an item category, a freshness satisfaction score, a brand, etc. associated with each item). Once the engagement prediction module 216 applies the engagement prediction model to the set of inputs, the engagement prediction module 216 may then receive an output from the model. The output may include a value corresponding to the user engagement score for a source. The engagement prediction module 216 may then store the user engagement score in the data store 240 among a set of source data for the source or among a set of user data for a user associated with the score. Additionally, the user engagement score for a source may be stored in association with various types of information (e.g., information associated with the source, information associated with the user, a time at which it was predicted, etc.). In some embodiments, the engagement prediction model may be trained by the machine-learning training module 230, as described below.

The source selection module 217 selects a set of sources from one or more sources identified by the source identification module 215. The source selection module 217 may do so based on a user engagement score for each source predicted by the engagement prediction module 216. For example, the source selection module 217 may select a set of sources associated with at least a threshold user engagement score from one or more sources identified by the source identification module 215. In some embodiments, the source selection module 217 ranks sources identified by the source identification module 215 and selects a set of sources from the identified sources based on the ranking. For example, the source selection module 217 may rank sources identified by the source identification module 215 based on a user engagement score for each source, such that the source associated with the highest user engagement score is ranked the highest and the source associated with the lowest user engagement score is ranked the lowest. In this example, the source selection module 217 may then select a set of sources associated with at least a threshold ranking.

The content generation/selection module 218 may generate a set of content items associated with each source selected by the source selection module 217. The content generation/selection module 218 may do so based on a set of user data associated with a user and a set of source data associated with each source. The set of content items may include text, images, videos, or any other suitable types of content associated with the source that is likely to be relevant to the user. For example, suppose that a set of user data for a user includes a hometown of the user and indicates that raw honey is a favorite item of the user. In this example, if an item available at a source includes award-winning raw honey harvested from the user's hometown, the content generation/selection module 218 may generate a content item associated with the source that includes an image of the raw honey that is available at the source and text indicating that the raw honey is harvested from the user's hometown (e.g., "Award-winning raw honey harvested from your hometown is available here!"). In some embodiments, the content generation/selection module 218 generates a set of content items associated with a source using a generative artificial intelligence (AI) model, such as a large-language model, a multi-modal large language model, etc. The content generation/selection module 218 may do so by generating a prompt that includes a set of user data for a user, a set of source data for the source, and a request for generation of content associated with the source that the user is likely to find relevant or that is associated with at least a threshold predicted measure of relevance to the user. For example, the prompt may include a request to generate a sentence explaining why a user may be interested in a source. The content generation/selection module 218 may then provide the prompt to the generative AI model to obtain an output and extract the content from the output. The content generation/selection module 218 may then generate a set of content items associated with the source that includes the content.

In embodiments in which a set of source data for a source selected by the source selection module 217 includes one or more content items associated with the source (e.g., one or more content items that are manually curated or received from one or more user client devices 100), the content generation/selection module 218 may select a set of content items associated with the source likely to be relevant to a user. The content generation/selection module 218 may do so by retrieving the content item(s) associated with the source and extracting a topic associated with each content item using various techniques, such as natural language processing (NLP), computer-vision, etc. The content generation/selection module 218 may then compare the topic associated with each content item to the set of user data for the user (e.g., the user's preferred or favorite sources/items, dietary restrictions/preferences, etc.) and determine a measure of similarity between the topic associated with each content item and the set of user data based on the comparison. The content generation/selection module 218 may then select a set of content items, in which each selected content item is associated with a topic having at least a threshold measure of similarity to the set of user data for the user.

In some embodiments, the content generation/selection module 218 uses content item embeddings describing content items and a user embedding describing a user to select a set of content items associated with each source selected by the source selection module 217 likely to be relevant to the user. The content item embeddings and user embedding may be generated by separate machine-learning models and may be stored in the data store 240. For example, the content generation/selection module 218 may apply natural language processing (NLP) techniques to the text in each content item associated with a source to generate an embedding that represents a topic of the content item and repeat this process for text included among user data for a user. In this example, the content generation/selection module 218 may compare the topic of each content item to the set of user data based on a distance between their corresponding embeddings in an embedding space. In the above example, the content generation/selection module 218 may then select a set of content items associated with topics likely to be relevant to the user based on a distance between the embedding representing the topic of each content item and an embedding representing the user (e.g., by identifying content items having topics represented by embeddings within a threshold distance of the embedding representing the user).

The order management module 220 manages orders for items from users. The order management module 220 receives orders from user client devices 100 and assigns the orders to pickers for service based on picker data. For example, the order management module 220 assigns an order to a picker based on the picker's location and the source from which the ordered items are to be collected. The order management module 220 may also assign an order to a picker based on how many items are in the order, a vehicle operated by the picker, the delivery location, the picker's preferences for how far to travel to deliver an order, the picker's ratings by users, or how often the picker agrees to service an order.

In some embodiments, the order management module 220 determines when to assign an order to a picker based on a delivery timeframe requested by the user who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the source associated with the order. If the order includes items to collect from multiple sources, the order management module 220 identifies the sources to the picker and may also specify a sequence in which the picker should visit the sources.

The order management module 220 may track the location of the picker through the picker client device 110 to determine when the picker arrives at the source. When the picker arrives at the source, the order management module 220 transmits the order to the picker client device 110 for display to the picker. As the picker uses the picker client device 110 to collect items at the source, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source. The order management module 220 uses sensor data from the picker client device 110 or from sensors in the source to determine the location of the picker in the source. The order management module 220 may transmit, to the picker client device 110, instructions to display a map of the source indicating where in the source the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source to the delivery location, or to a subsequent source for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the source operator.

The machine-learning training module 230 trains machine-learning models used by the online system 140. The online system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative AI models (e.g., generative adversarial networks, large language models, etc.) or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model is used by the machine-learning model to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, conversion data, or source data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

In embodiments in which the item scoring module 212 accesses and applies the freshness satisfaction prediction model to predict a freshness satisfaction score for an item available at a source, the machine-learning training module 230 may train the freshness satisfaction prediction model. The machine-learning training module 230 may train the freshness satisfaction prediction model via supervised learning or using any other suitable technique or combination of techniques based on various types of data stored in the data store 240 or any other suitable types of data. For example, the machine-learning training module 230 may train the freshness satisfaction prediction model based on user data, item data, and conversion data stored in the data store 240.

To illustrate an example of how the machine-learning training module 230 may train the freshness satisfaction prediction model, suppose that the machine-learning training module 230 receives a set of training examples including various attributes of items available at each of one or more sources. In this example, the set of training examples may describe a life cycle of each item, an availability of the item at a source (e.g., a set of images of each item captured at the source), historical conversion information associated with each item, etc. In the above example, the set of training examples also may include attributes of conversions by users of the online system 140, such as information describing one or more items included in each order placed by a user or each purchase made by a user, a time associated with each order/purchase, information describing a source associated with each order/purchase, etc. In this example, the set of training examples also may include attributes of the users associated with the conversions, such as each user's favorite items, demographic or household information associated with each user, historical information associated with each user, etc. In the above example, the machine-learning training module 230 also may receive labels which represent expected outputs of the freshness satisfaction prediction model, in which a label describes a measure of satisfaction of a user with the freshness of a set of items associated with a corresponding conversion. Continuing with this example, the machine-learning training module 230 may then train the freshness satisfaction prediction model based on the attributes, as well as the labels by comparing its output from input data of each training example to the label for the training example.

In embodiments in which the engagement prediction module 216 accesses and applies the engagement prediction model to predict a user engagement score for a source, the machine-learning training module 230 may train the engagement prediction model. The machine-learning training module 230 may train the engagement prediction model via supervised learning or using any other suitable technique or combination of techniques based on various types of data stored in the data store 240 or any other suitable types of data. For example, the machine-learning training module 230 may train the engagement prediction model based on source data, user data, and item data stored in the data store 240.

To illustrate an example of how the machine-learning training module 230 may train the engagement prediction model, suppose that the machine-learning training module 230 receives a set of training examples including various attributes of sources. In this example, the attributes may describe each source (e.g., its name, geographical location, hours of operation, etc.), a source operator that operates each source, items available at each source, a set of content items associated with each source, etc. Continuing with this example, the set of training examples also may include attributes of items available at each source, such as a freshness satisfaction score, a brand, a price, one or more item categories, etc. associated with each item. In the above example, the set of training examples also may include attributes of users of the online system 140, such as information describing each user's age, gender, interests, hobbies, educational history, occupation, demographic information, household information, previous interactions, etc. In the above example, the machine-learning training module 230 also may receive labels which represent expected outputs of the engagement prediction model, in which a label describes an interaction of a user with an item available at a source. Continuing with this example, the machine-learning training module 230 may then train the engagement prediction model based on the attributes, as well as the labels by comparing its output from input data of each training example to the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In situations in which the training example includes a label, the loss function is also based on the label for the training example. Some example loss functions include the mean square error function, the mean absolute error, the hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, conversion data, source data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Displaying an Interactive Geographical Map of Sources

Figure 3:
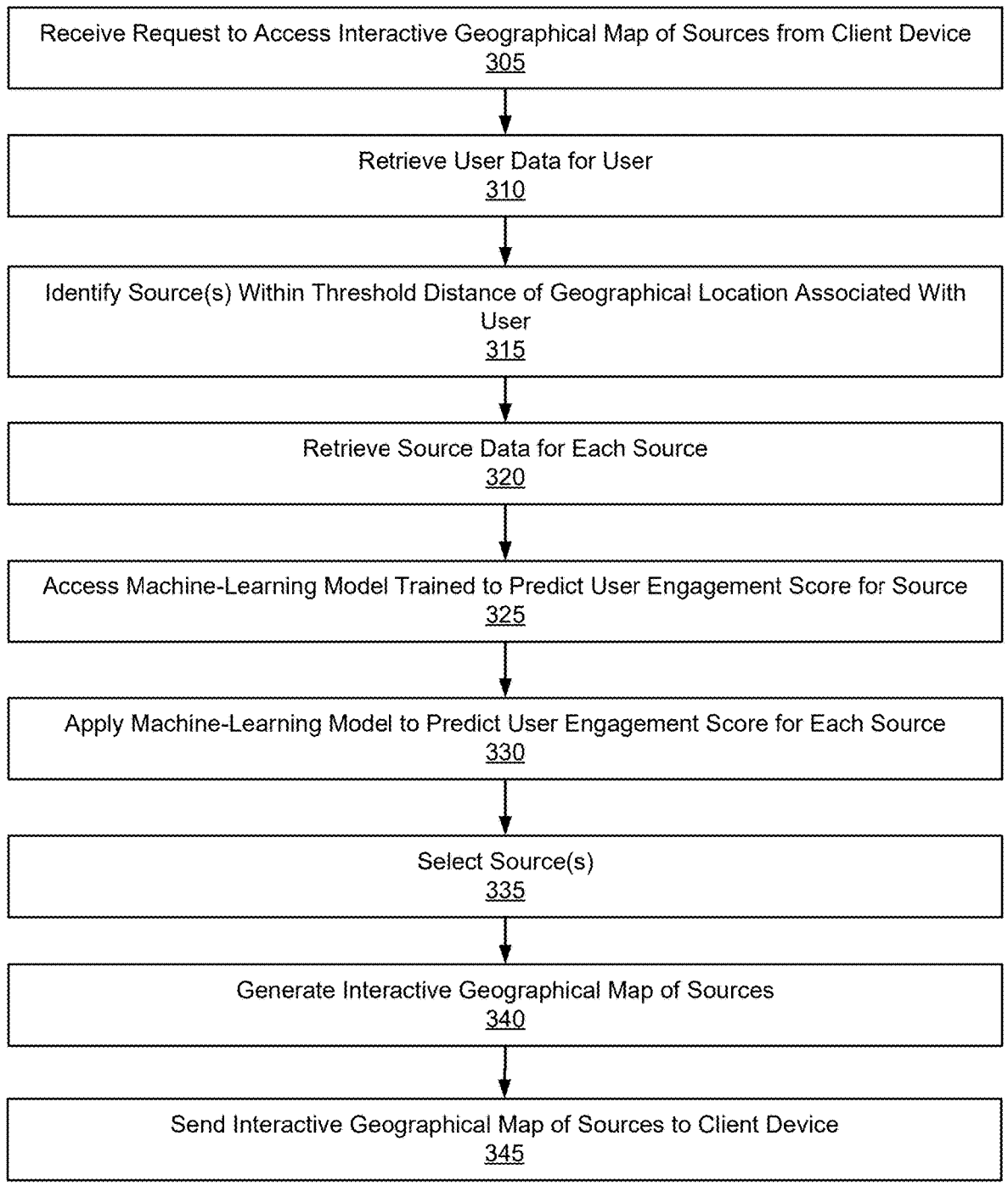
FIG. 3 is a flowchart of a method for displaying an interactive geographical map of sources, in accordance with one or more embodiments.

FIG. 3 is a flowchart for a method for displaying an interactive geographical map of sources, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system. Additionally, each of these steps may be performed automatically by the online system 140 without human intervention.

The online system 140 receives 305 (e.g., via the interface module 211) a request from a user client device 100 associated with a user of the online system 140 to access an interactive geographical map of sources. The interactive geographical map of sources is a geographical map that indicates the geographical location of one or more sources included in the map, while a source is a retailer location, a store, a warehouse, a farm, a stand, a truck, or other location or building from which a picker can collect items or from which a user may order or purchase items. For example, a source may be a stand at a farmers' market operated by a source operator, such as a farmer or a farm employee.

In some embodiments, the online system 140 retrieves (e.g., using the item scoring module 212) data (e.g., item data, user data, conversion data, etc. from the data store 240) and predicts (e.g., using the item scoring module 212) freshness satisfaction scores for items based on data it retrieves. As described above, a freshness satisfaction score for an item available at a source indicates a measure of satisfaction of a user with the freshness of the item. The online system 140 may do so using various techniques applied to the retrieved data, such as natural language processing (NLP), computer-vision, speech recognition, or any other suitable technique or combination of techniques. The online system 140 also may associate different weights with different types of information used to make the prediction (e.g., by weighting newer data more heavily than older data). In some embodiments, a freshness satisfaction score is generalized for multiple users of the online system 140, such that it indicates a measure of satisfaction of the users with the freshness of an item. In other embodiments, a freshness satisfaction score is specific to the user associated with the user client device 100 from which the request was received 305, such that it indicates a measure of satisfaction of the user with the freshness of an item.

In some embodiments, the online system 140 predicts a freshness satisfaction score for an item using a freshness satisfaction prediction model. A freshness satisfaction prediction model is a machine-learning model trained to predict a freshness satisfaction score for an item available at a source. To use the freshness satisfaction prediction model, the online system 140 may access the model (e.g., from the data store 240) and apply the model to a set of inputs. The set of inputs may include various types of data retrieved by the online system 140 described above. Once the online system 140 applies the freshness satisfaction prediction model to a set of inputs, the online system 140 may then receive an output from the model. The output may include a value corresponding to the freshness satisfaction score for the item. The online system 140 may then store the freshness satisfaction score (e.g., in the data store 240) among a set of item data for the item or among a set of user data for a user associated with the score (if any). Additionally, the freshness satisfaction score may be stored in association with various types of information (e.g., information associated with the item, information associated with a user associated with the score, etc.). In some embodiments, the freshness satisfaction prediction model may be trained by the online system 140 (e.g., using the machine-learning training module 230).

The online system 140 then retrieves 310 (e.g., using the source identification module 215) a set of user data for the user associated with the user client device 100 from which the request was received 305 (e.g., from the data store 240). The set of user data may include information describing a geographical location associated with the user. As described above, a geographical location associated with a user may correspond to a delivery address associated with the user, a geographical location of a user client device 100 associated with the user, a hometown of the user, a geographical location specified by the user, or any other suitable geographical location associated with the user.

The online system 140 may then identify 315 (e.g., using the source identification module 215) one or more sources within a threshold distance of the geographical location associated with the user. The online system 140 may do so by retrieving information describing a geographical location of each of various sources (e.g., from the data store 240) and identifying 315 the source(s) based on this information and the information describing the geographical location associated with the user. The threshold distance may be a default distance (e.g., a 10-mile radius) or it may be specified by the user. The online system 140 also may identify 315 the source(s) based on the geographical location associated with the user and other types of criteria (e.g., a city, a zip code, etc. associated with the geographical location associated with the user and each source).

The online system 140 also may retrieve (step 320, e.g., using the engagement prediction module 216) source data for the identified source(s), as well as additional types of data (e.g., from the data store 240) and predict (e.g., using the engagement prediction module 216) a user engagement score for each identified source based on the retrieved data. Examples of the additional types of data the online system 140 may retrieve 320 include: item data for one or more items available at the identified source(s), user data for the user associated with the user client device 100 from which the request was received 305 or one or more additional users, or any other suitable types of data. The user engagement score for a source indicates a likelihood of one or more interactions by the user associated with the user client device 100 from which the request was received 305 with a set of items available at the source if the source is included in the interactive geographical map of sources that is presented to the user. In some embodiments, the user engagement score describes a predicted rate (e.g., a predicted conversion rate), a predicted value (e.g., a predicted long-term value), or another predicted metric associated with a source. The user engagement score for a source may be proportional to a likelihood that the user will perform one or more interactions with a set of items available at the source.

In some embodiments, the online system 140 predicts a user engagement score for a source using an engagement prediction model. An engagement prediction model is a machine-learning model trained to predict a user engagement score for a source. To use the engagement prediction model, the online system 140 may access 325 (e.g., using the engagement prediction module 216) the model (e.g., from the data store 240) and apply 330 (e.g., using the engagement prediction module 216) the model to a set of inputs. The set of inputs may include various types of data retrieved 320 by the online system 140 described above. Once the online system 140 applies 330 the engagement prediction model to the set of inputs, the online system 140 may then receive (e.g., via the engagement prediction module 216) an output from the model. The output may include a value corresponding to the user engagement score for an identified source. The online system 140 may then store (e.g., using the engagement prediction module 216) the user engagement score (e.g., in the data store 240) among a set of source data for the source or among a set of user data for the user. Additionally, the user engagement score for an identified source may be stored in association with various types of information (e.g., information associated with the source, information associated with the user, a time at which it was predicted, etc.). In some embodiments, the engagement prediction model may be trained by the online system 140 (e.g., using the machine-learning training module 230).

The online system 140 then selects 335 (e.g., using the source selection module 217) a set of sources from the identified source(s). The online system 140 may do so based on a user engagement score for each source predicted by the online system 140. In embodiments in which multiple sources are identified 315, the online system 140 may rank (e.g., using the source selection module 217) the identified sources and select 335 the set of sources from the identified sources based on the ranking.

In some embodiments, the online system 140 generates (e.g., using the content generation/selection module 218) a set of content items associated with each source selected 335 by the online system 140. The online system 140 may do so based on a set of source data associated with each source and a set of user data associated with the user associated with the user client device 100 from which the request was received 305. The set of content items may include text, images, videos, or any other suitable types of content associated with the source that is likely to be relevant to the user. In some embodiments, the online system 140 generates the set of content items associated with a source using a generative artificial intelligence (AI) model, such as a large-language model, a multi-modal large language model, etc. The online system 140 may do so by generating (e.g., using the content generation/selection module 218) a prompt that includes a set of user data for the user, a set of source data for the source, and a request for generation of content associated with the source that the user is likely to find relevant or that is associated with at least a threshold predicted measure of relevance to the user. The online system 140 may then provide (e.g., using the content generation/selection module 218) the prompt to the generative AI model to obtain an output and extract (e.g., using the content generation/selection module 218) the content from the output. The online system 140 may then generate (e.g., using the content generation/selection module 218) the set of content items associated with the source that includes the content.

In embodiments in which a set of source data for a source selected 335 by the online system 140 includes one or more content items associated with the source (e.g., one or more content items that are manually curated or received from one or more user client devices 100), the online system 140 may select (e.g., using the content generation/selection module 218) a set of content items associated with the source likely to be relevant to the user. The online system 140 may do so by retrieving (e.g., using the content generation/selection module 218) the content item(s) associated with the source and extracting (e.g., using the content generation/selection module 218) a topic associated with each content item using various techniques, such as natural language processing (NLP), computer-vision, etc. The online system 140 may then compare (e.g., using the content generation/selection module 218) the topic associated with each content item to the set of user data for the user (e.g., the user's preferred or favorite sources/items, dietary restrictions/preferences, etc.). The online system 140 may then determine (e.g., using the content generation/selection module 218) a measure of similarity between the topic associated with each content item and the set of user data based on the comparison. The online system 140 may then select (e.g., using the content generation/selection module 218) the set of content items, in which each selected content item is associated with a topic having at least a threshold measure of similarity to the set of user data for the user. In some embodiments, the online system 140 uses content item embeddings describing content items and a user embedding describing the user to select a set of content items associated with each source selected 335 by the online system 140 likely to be relevant to the user. The content item embeddings and user embedding may be generated by separate machine-learning models and may be stored (e.g., in the data store 240).

Figure 4A:
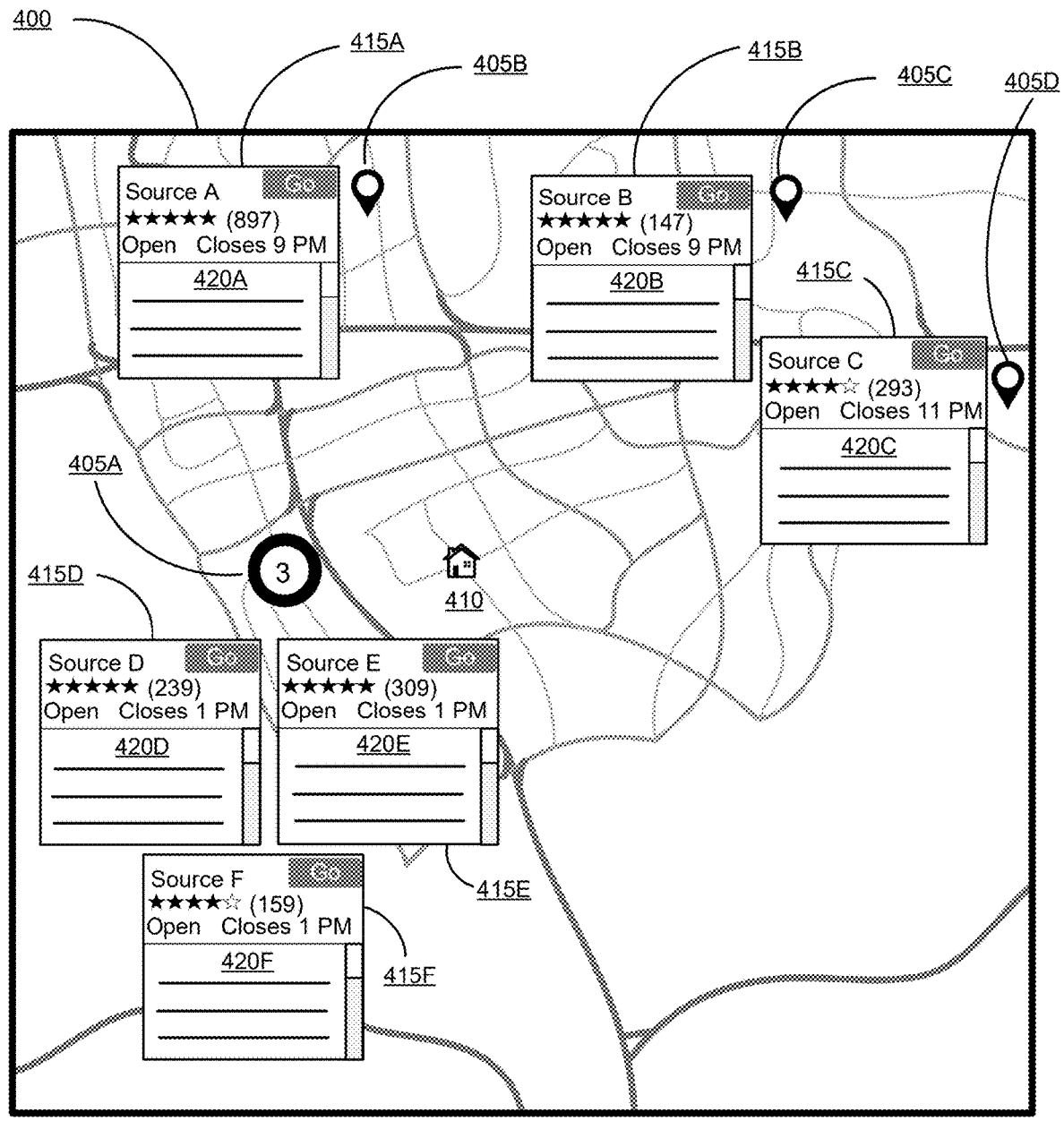
FIGS. 4A-4C illustrate examples of an interactive geographical map of sources, in accordance with one or more embodiments.
Figure 4B:
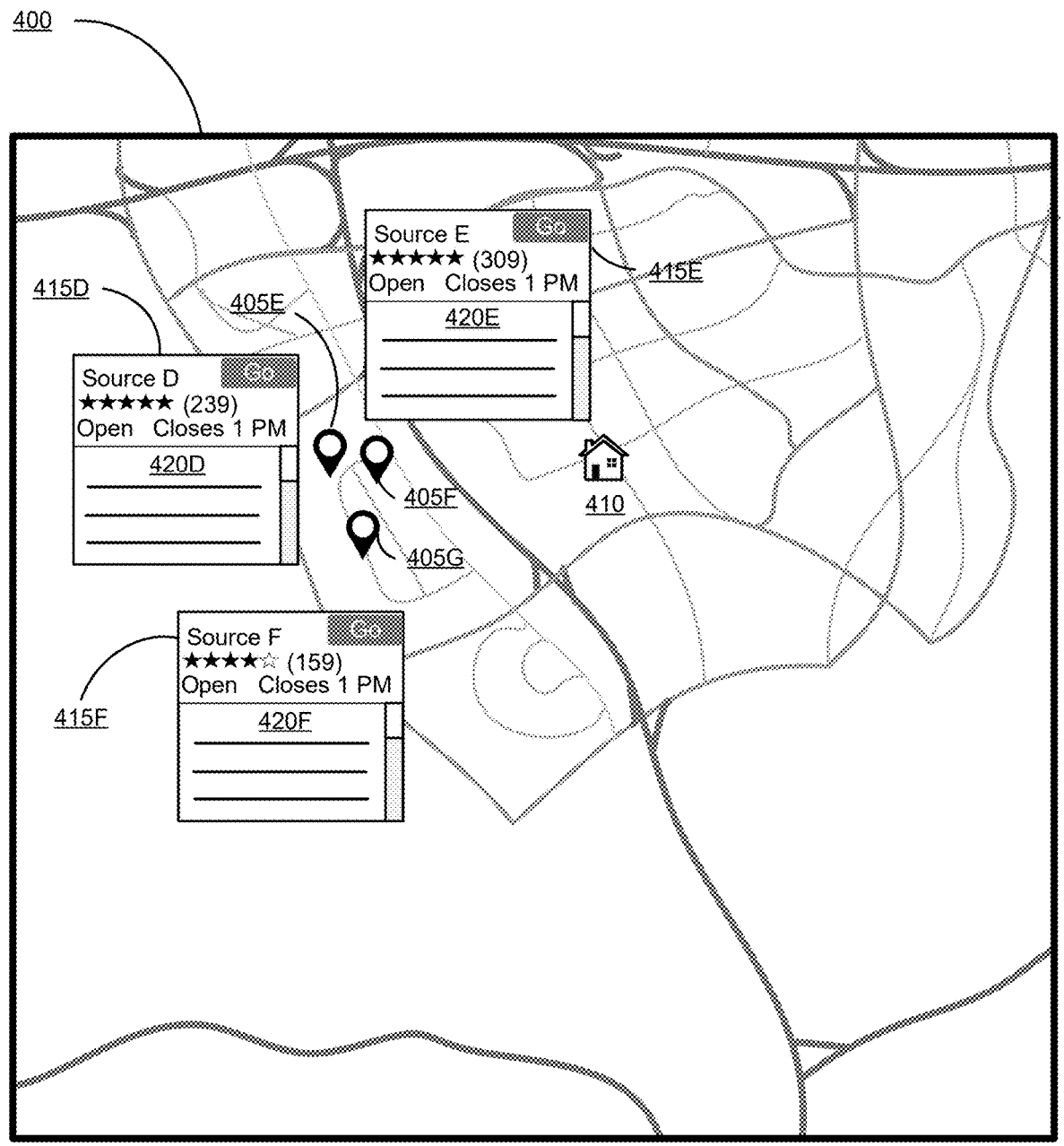
Figure 4C:
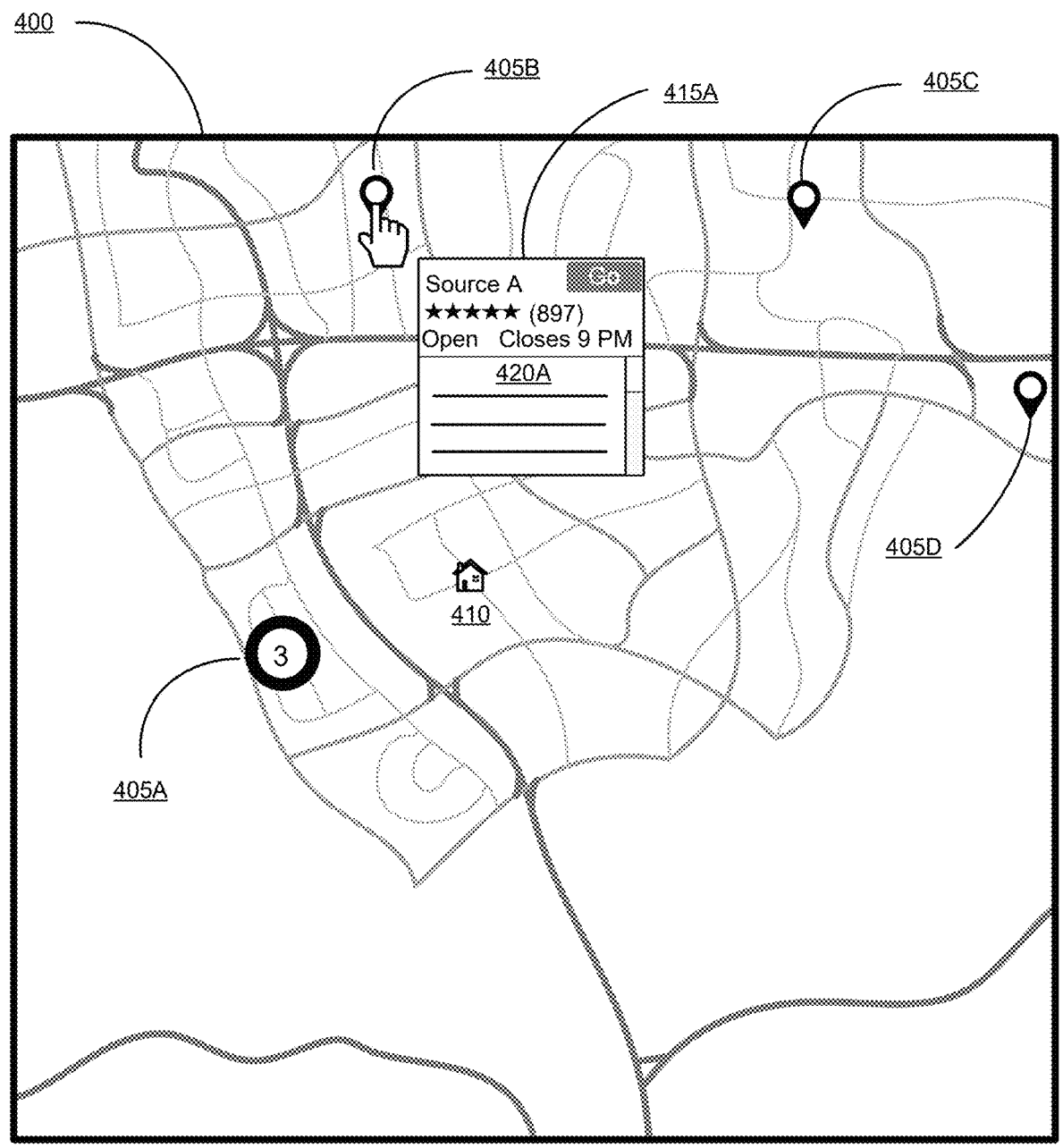

The online system 140 then generates 340 (e.g., using the interface module 211) the interactive geographical map of sources based on the set of sources selected 335 by the online system 140. The interactive geographical map of sources may indicate the geographical location of the sources selected 335 by the online system 140. FIGS. 4A-4C illustrate examples of an interactive geographical map of sources, in accordance with one or more embodiments. Referring first to the example of FIG. 4A, the interactive geographical map of sources 400 may be a map of a geographical area within a 20-mile radius of the geographical location associated with the user and include a marker 405A-D indicating a geographical location of each selected source. In various embodiments, the geographical locations of multiple sources may be indicated by a combined marker 405 (e.g., a marker 405 including a number indicating the number of sources represented by the marker 405). For example, as shown in FIG. 4A, marker 405A represents the geographical locations of three sources. In some embodiments, the geographical map of sources 400 is navigable, such that the user may scroll to display additional geographical areas on the geographical map of sources 400.

Figure 5:
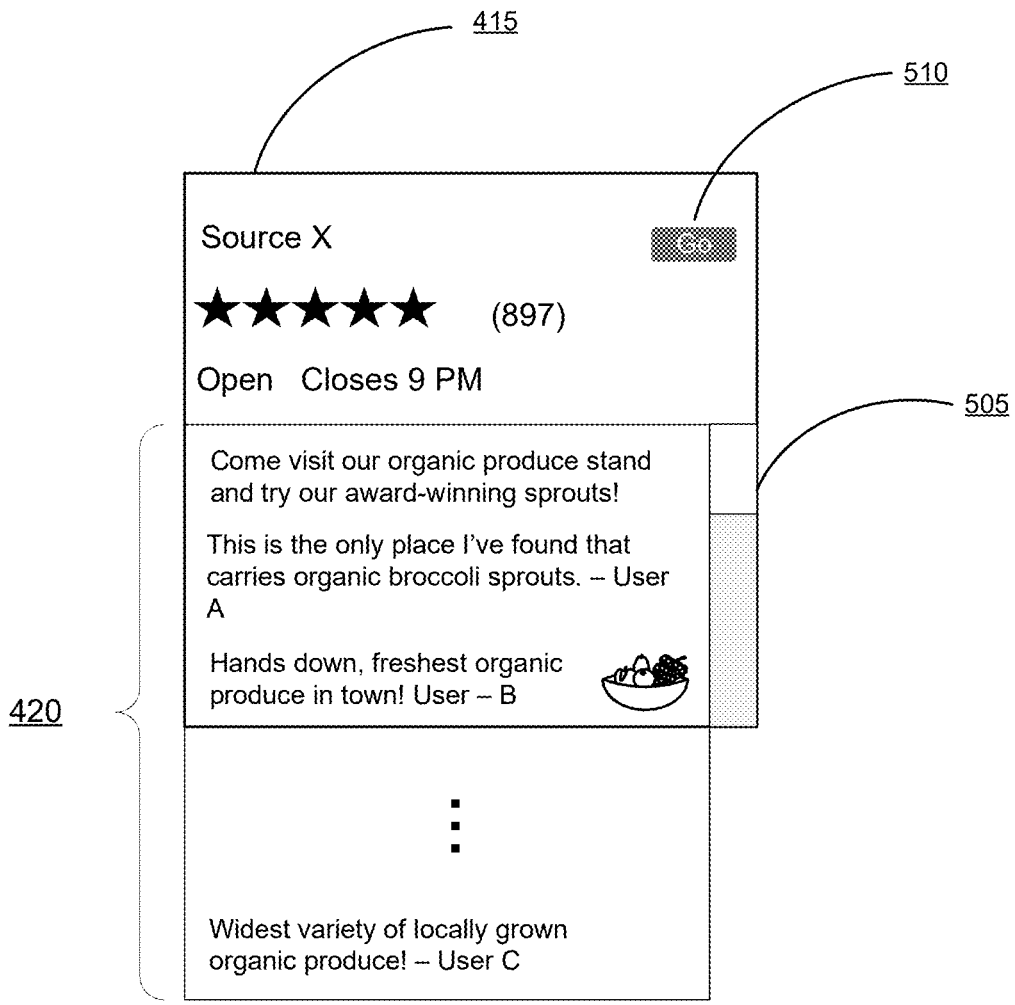
FIG. 5 illustrates an example of a set of source data associated with a source included in an interactive geographical map of sources, in accordance with one or more embodiments.

The interactive geographical map of sources 400 also may include additional content or components. In some embodiments, the interactive geographical map of sources 400 indicates a geographical location associated with the user. For example, as shown in FIG. 4A, the interactive geographical map of sources 400 may include an additional marker 410 indicating the geographical location (e.g., a delivery address) associated with the user. The interactive geographical map of sources 400 also may include a set of source data associated with each selected source. For example, as shown in FIG. 4A, for each source, the interactive geographical map of sources 400 may include a window 415A-F with a name, a user rating, hours of operation, a set of content items 420A-F, etc. associated with the source. The interactive geographical map of sources 400 also may include one or more interactive elements, such as buttons, scroll bars, etc. FIG. 5 illustrates an example of a set of source data associated with a source included in an interactive geographical map of sources, in accordance with one or more embodiments. As shown in FIG. 5, the window 415 also may include a scroll bar 505 that allows the user to view additional content items 420 or a button 510 that navigates the user to the ordering interface, allowing the user to add items associated with the source to a shopping list associated with the user.

Referring back to FIG. 3, once the online system 140 generates 340 the interactive geographical map of sources 400, the online system 140 may send 345 (e.g., using the interface module 211) it to the user client device 100, causing the user client device 100 to display the interactive geographical map of sources 400. The online system 140 also may update (e.g., using the interface module 211) the interactive geographical map of sources 400 and send 345 it to a user client device 100, causing the user client device 100 to display the updated interactive geographical map of sources 400.

In some embodiments, the online system 140 updates the interactive geographical map of sources 400 based on a zoom level associated with the interactive geographical map of sources 400. For example, as shown in FIG. 4A, suppose that of the six sources within the 20-mile radius of the geographical location associated with the user, half are within a 10-mile radius of the geographical location associated with the user. In this example, if the online system 140 receives (e.g., via the interface module 211) an additional request from the user client device 100 to zoom in on the interactive geographical map of sources 400 to display a geographical area within the 10-mile radius, the online system 140 may update the interactive geographical map of sources 400 to include only this area and to indicate the location of the three sources within it, as shown in FIG. 4B. Furthermore, in this example, although the interactive geographical map of sources 400 originally included a combined marker 405A indicating the geographical location of multiple sources, the geographical location of each source may be indicated by a separate marker 405E-G if the geographical locations of the sources are no longer within the threshold distance of each other, as also shown in FIG. 4B. In the above example, suppose that the online system 140 then receives another request from the user client device 100 to zoom out of the interactive geographical map of sources 400 to display a geographical area within a 30-mile radius of the geographical location of the user client device 100. In this example, the online system 140 may update the interactive geographical map of sources 400 to include this larger area and to indicate the location of the original six sources, as well as any additional sources within the 30-mile radius.

The online system 140 also may update the interactive geographical map of sources 400 based on additional types of information. In various embodiments, the online system 140 updates the interactive geographical map of sources 400 based on information describing a filter to be applied to it. A filter may describe a set of source data associated with a source, such as an item category associated with a set of items available at the source, hours of operation for the source, a city in which the source is located, etc. In the above example, if the online system 140 receives a request from the user client device 100 to apply a filter describing one or more item categories (e.g., meat, dairy, produce, etc.) to the interactive geographical map of sources 400, the online system 140 may update the interactive geographical map of sources 400 by removing information indicating the location of sources at which items associated with the item categories are not available. The online system 140 also may update the interactive geographical map of sources 400 based on an interaction with an interactive element included in the interactive geographical map of sources 400 received from the user client device 100. For example, as shown in FIG. 4C, suppose that the marker 405A-D indicating a geographical location of each source in the interactive geographical map of sources 400 is an interactive element. In this example, the online system 140 may update the interactive geographical map of sources 400 to include a window 415A with a name, hours of operation, a user rating, a set of content items 420A, etc. associated with the source upon receiving an interaction with the marker 405B (e.g., by hovering over the marker 405B or by selecting the marker 405B). As an additional example, suppose that the interactive geographical map of sources 400 is navigable and that the online system 140 receives an interaction with the interactive geographical map of sources 400 corresponding to a request to scroll beyond an edge of the interactive geographical map of sources 400. In this example, based on the request, the online system 140 may update the interactive geographical map of sources 400 to include a geographical area beyond the edge of the geographical area originally displayed.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer-readable medium, comprising:

receiving, from a client device associated with a user of an online system, a request to access an interactive geographical map of sources;

retrieving a set of user data for the user, the set of user data comprising information describing a geographical location associated with the user;

identifying one or more sources within a threshold distance of the geographical location associated with the user;

retrieving a set of source data for each source of the one or more sources, the set of source data comprising information describing a set of items available at each source;

accessing a machine-learning model trained to predict a user engagement score for a source, wherein the user engagement score indicates a likelihood of one or more interactions by the user with the set of items available at the source if the source is included in the interactive geographical map of sources to be presented to the user, wherein the machine-learning model is trained by:

receiving source data for a plurality of sources, receiving user data for a plurality of users of the online system, receiving, for each user of the plurality of users, a label describing an interaction of a corresponding user with an item available at a source, and training the machine-learning model based at least in part on the source data, the user data, and the label for each user of the plurality of users;

applying the machine-learning model to predict the user engagement score for each source of the one or more sources based at least in part on the set of user data and a corresponding set of source data;

selecting a set of sources from the one or more sources based at least in part on the user engagement score for each source of the one or more sources;

generating the interactive geographical map of sources based at least in part on the set of sources, wherein the interactive geographical map of sources indicates the geographical location of each source of the set of sources; and sending the interactive geographical map of sources to the client device associated with the user, wherein sending the interactive geographical map of sources causes the client device to display the interactive geographical map of sources.

2. The method of claim 1, wherein retrieving the set of source data for each source of the one or more sources comprises retrieving one or more of: a name of a source, a set of hours of operation for a source, or a user rating for a source.

3. The method of claim 1, wherein retrieving the set of user data for the user comprises retrieving historical interaction information associated with the user, the historical interaction information describing one or more previous interactions by the user with one or more of: a source or an item.

4. The method of claim 1, wherein the user engagement score for a source describes one or more of: a conversion rate associated with a source or a long-term value associated with a source.

5. The method of claim 1, further comprising:
updating the interactive geographical map of sources based at least in part on a zoom level associated with the interactive geographical map of sources.

6. The method of claim 1, further comprising:
updating the interactive geographical map of sources based at least in part on information describing a filter to be applied to the interactive geographical map of sources, the filter received from the client device and describing an item category associated with a set of items available at each source of the one or more sources.

7. The method of claim 1, wherein generating the interactive geographical map of sources based at least in part on the set of sources comprises generating the interactive geographical map of sources based on a set of content items associated with each source of the set of sources, wherein the interactive geographical map of sources further comprises the set of content items associated with each source of the set of sources and each content item of the set of content items is associated with at least a threshold predicted measure of relevance to the user.

8. The method of claim 7, further comprising:
generating a prompt that comprises:
the set of user data for the user,
the set of source data for each source of the set of sources, and
a request for generation of content associated with each source of the set of sources, wherein the content is associated with at least the threshold predicted measure of relevance to the user;
providing the prompt to a generative artificial intelligence model to obtain an output;
extracting, from the output, the content associated with each source of the set of sources; and
for each source of the set of sources, generating the set of content items comprising the content associated with a corresponding source.

9. The method of claim 7, further comprising:
retrieving one or more content items associated with each source of the set of sources;
extracting a topic associated with each content item of the one or more content items;
comparing the topic associated with each content item of the one or more content items to the set of user data for the user;
generating a measure of similarity between the topic associated with each content item of the one or more content items and the set of user data for the user based at least in part on the comparing; and
selecting, from the one or more content items associated with each source of the set of sources, the set of content items associated with each source of the set of sources, wherein the topic associated with each content item of the set of content items is associated with at least a threshold measure of similarity to the set of user data for the user.

10. The method of claim 9, wherein retrieving the one or more content items associated with each source of the one or more sources comprises retrieving one or more of: a set of manually curated content items or a set of content items received from one or more client devices associated with one or more users of the online system.

11. A computer program product comprising a non-transitory computer-readable storage medium having instructions encoded thereon that, when executed by a processor, cause the processor to perform steps comprising:
receiving, from a client device associated with a user of an online system, a request to access an interactive geographical map of sources;
retrieving a set of user data for the user, the set of user data comprising information describing a geographical location associated with the user;
identifying one or more sources within a threshold distance of the geographical location associated with the user;
retrieving a set of source data for each source of the one or more sources, the set of source data comprising information describing a set of items available at each source;
accessing a machine-learning model trained to predict a user engagement score for a source, wherein the user engagement score indicates a likelihood of one or more interactions by the user with the set of items available at the source if the source is included in the interactive geographical map of sources to be presented to the user, wherein the machine-learning model is trained by:
receiving source data for a plurality of sources,
receiving user data for a plurality of users of the online system,
receiving, for each user of the plurality of users, a label describing an interaction of a corresponding user with an item available at a source, and
training the machine-learning model based at least in part on the source data, the user data, and the label for each user of the plurality of users;
applying the machine-learning model to predict the user engagement score for each source of the one or more sources based at least in part on the set of user data and a corresponding set of source data;

selecting a set of sources from the one or more sources based at least in part on the user engagement score for each source of the one or more sources;

generating the interactive geographical map of sources based at least in part on the set of sources, wherein the interactive geographical map of sources indicates the geographical location of each source of the set of sources; and sending the interactive geographical map of sources to the client device associated with the user, wherein sending the interactive geographical map of sources causes the client device to display the interactive geographical map of sources.

12. The computer program product of claim 11, wherein retrieving the set of source data for each source of the one or more sources comprises retrieving one or more of: a name of a source, a set of hours of operation for a source, or a user rating for a source.

13. The computer program product of claim 11, wherein retrieving the set of user data for the user comprises retrieving historical interaction information associated with the user, the historical interaction information describing one or more previous interactions by the user with one or more of: a source or an item.

14. The computer program product of claim 11, wherein the user engagement score for a source describes one or more of: a conversion rate associated with a source or a long-term value associated with a source.

15. The computer program product of claim 11, wherein the non-transitory computer-readable storage medium further has instructions encoded thereon that, when executed by the processor, cause the processor to perform steps comprising:

updating the interactive geographical map of sources based at least in part on a zoom level associated with the interactive geographical map of sources.

16. The computer program product of claim 11, wherein the non-transitory computer-readable storage medium further has instructions encoded thereon that, when executed by the processor, cause the processor to perform steps comprising:

updating the interactive geographical map of sources based at least in part on information describing a filter to be applied to the interactive geographical map of sources, the filter received from the client device and describing an item category associated with a set of items available at each source of the one or more sources.

17. The computer program product of claim 11, wherein generating the interactive geographical map of sources based at least in part on the set of sources comprises generating the interactive geographical map of sources based on a set of content items associated with each source of the set of sources, wherein the interactive geographical map of sources further comprises the set of content items associated with each source of the set of sources and each content item of the set of content items is associated with at least a threshold predicted measure of relevance to the user.

18. The computer program product of claim 17, wherein the non-transitory computer-readable storage medium further has instructions encoded thereon that, when executed by the processor, cause the processor to perform steps comprising:

generating a prompt that comprises:
the set of user data for the user,
the set of source data for each source of the set of sources, and a request for generation of content associated with each source of the set of sources, wherein the content is associated with at least the threshold predicted measure of relevance to the user;

providing the prompt to a generative artificial intelligence model to obtain an output;

extracting, from the output, the content associated with each source of the set of sources; and for each source of the set of sources, generating the set of content items comprising the content associated with a corresponding source.

19. The computer program product of claim 17, wherein the non-transitory computer-readable storage medium further has instructions encoded thereon that, when executed by the processor, cause the processor to perform steps comprising:

retrieving one or more content items associated with each source of the set of sources;

extracting a topic associated with each content item of the one or more content items;

comparing the topic associated with each content item of the one or more content items to the set of user data for the user;

generating a measure of similarity between the topic associated with each content item of the one or more content items and the set of user data for the user based at least in part on the comparing; and selecting, from the one or more content items associated with each source of the set of sources, the set of content items associated with each source of the set of sources, wherein the topic associated with each content item of the set of content items is associated with at least a threshold measure of similarity to the set of user data for the user.

20. A computer system comprising:

a processor; and a non-transitory computer-readable storage medium storing instructions that, when executed by the processor, perform actions comprising:

receiving, from a client device associated with a user of an online system, a request to access an interactive geographical map of sources;

retrieving a set of user data for the user, the set of user data comprising information describing a geographical location associated with the user;

identifying one or more sources within a threshold distance of the geographical location associated with the user;

retrieving a set of source data for each source of the one or more sources, the set of source data comprising information describing a set of items available at each source;

accessing a machine-learning model trained to predict a user engagement score for a source, wherein the user engagement score indicates a likelihood of one or more interactions by the user with the set of items available at the source if the source is included in the interactive geographical map of sources to be presented to the user, wherein the machine-learning model is trained by:

receiving source data for a plurality of sources, receiving user data for a plurality of users of the online system, receiving, for each user of the plurality of users, a label describing an interaction of a corresponding user with an item available at a source, and training the machine-learning model based at least in part on the source data, the user data, and the label for each user of the plurality of users;
applying the machine-learning model to predict the user engagement score for each source of the one or more sources based at least in part on the set of user data and a corresponding set of source data;
selecting a set of sources from the one or more sources based at least in part on the user engagement score for each source of the one or more sources;
generating the interactive geographical map of sources based at least in part on the set of sources, wherein the interactive geographical map of sources indicates the geographical location of each source of the set of sources; and
sending the interactive geographical map of sources to the client device associated with the user, wherein sending the interactive geographical map of sources causes the client device to display the interactive geographical map of sources.

* * * * *